United States Patent [19]

Potocnik

[11] Patent Number: 4,643,379

[45] Date of Patent: Feb. 17, 1987

[54] SUPPORT SYSTEM FOR ELECTRICAL CABLES

[75] Inventor: Otto J. Potocnik, Jona, Switzerland

[73] Assignee: EHV-Weidmann Industries, Inc., Jona, Switzerland

[21] Appl. No.: 791,809

[22] Filed: Oct. 28, 1985

[51] Int. Cl.⁴ .............................................. F16L 3/00
[52] U.S. Cl. .................................... 248/49; 248/68.1
[58] Field of Search ......................... 248/49, 68.1, 69; 403/286, 341, 346, 363, 373, 403, 404, 405, 390, 391; 211/26; 174/43, 44

[56] References Cited

U.S. PATENT DOCUMENTS

| 1,915,918 | 6/1933 | Bostwick | 403/391 X |
| 3,365,540 | 1/1968 | Davis et al. | 248/68.1 X |
| 3,905,483 | 9/1975 | Patrick | 211/26 X |
| 4,171,838 | 10/1979 | Grundy | 403/391 X |
| 4,395,009 | 7/1983 | Bormke | 248/68.1 |

FOREIGN PATENT DOCUMENTS

| 2729481 | 1/1979 | Fed. Rep. of Germany | 248/49 |
| 407152 | 9/1944 | Italy | 248/68.1 |
| 348192 | 9/1960 | Switzerland | 211/26 |
| 538730 | 8/1941 | United Kingdom | 248/68.1 |

Primary Examiner—J. Franklin Foss
Attorney, Agent, or Firm—Sughrue, Mion, Zinn, Macpeak & Seas

[57] ABSTRACT

The support system for electrical cables includes a plurality of orthogonally disposed support rails and standardized clamping joints for adjustably clamping the rails together. Cable supporting beams may be disposed in spaced, parallel relation to selected rails and standardized clamping joints are provided at opposite ends of the cable supporting beams for adjustably connecting beams to a rail and clamping a plurality of cables therebetween. All of the beams, rails and joints are of insulating material.

8 Claims, 16 Drawing Figures

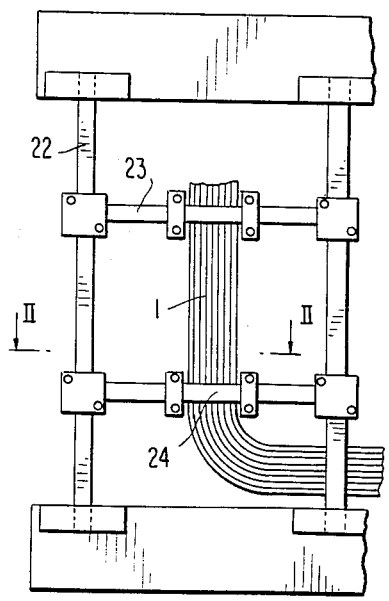
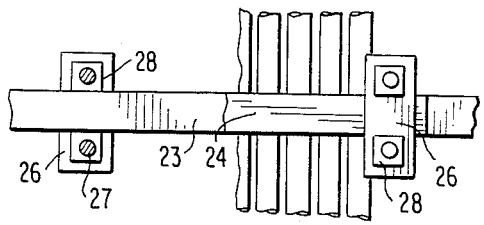
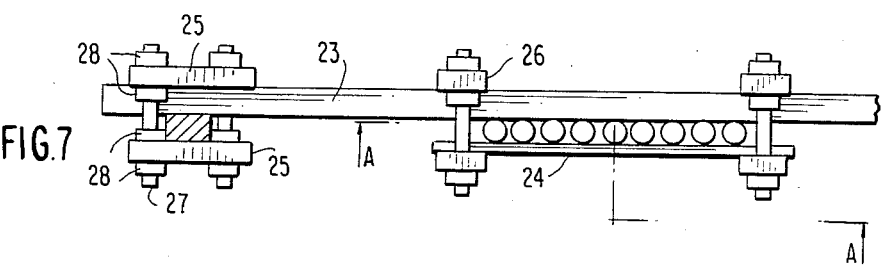
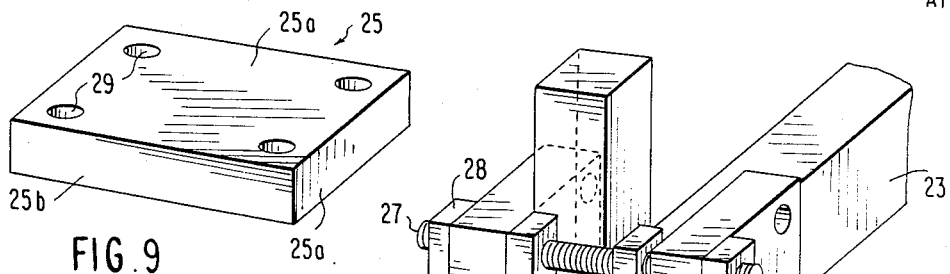
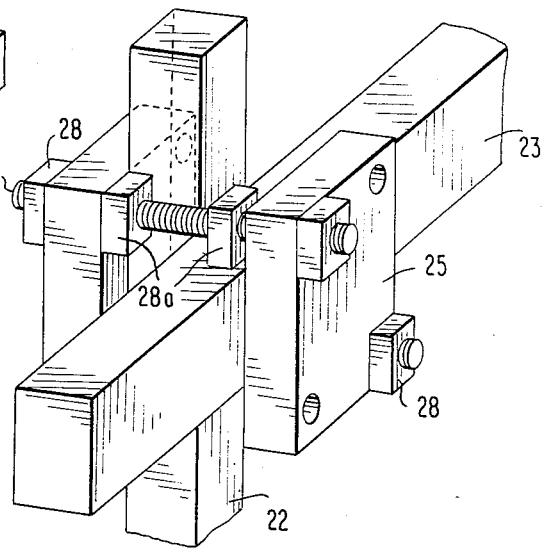

1

SUPPORT SYSTEM FOR ELECTRICAL CABLES

BACKGROUND OF THE INVENTION

The present invention is directed to a support system for electrical cables made out of insulating material for use in high voltage equipment such as liquid filled transformers and reactors. Electrical cables in high voltage equipment such as cables in liquid filled transformers or reactors which connect winding ends or winding taps to tap changers, bushings, or other components like current transformers and the like are subjected to high mechanical forces in the event of a short circuit in service. They are also subjected to over-voltages such as lightning surges which create high electrical stress.

It is common practice to custom design the necessary cable clamping fixtures for each individual transformer. The cable clamping fixtures are generally made out of wood, transformer wood or transformer board. It is obvious that when the production is based on the custom fitting of a cable clamping system, the production costs become expensive and lead to an unwarranted lengthening of the production cycle.

SUMMARY OF THE INVENTION

The present invention provides a new and improved support system for electrical cables which eliminates the need for custom designing and producing a cable support system for electrical cables in high voltage equipment by utilizing a universal structure which permits the use of the same elements to create a cable support system for any size and design of high voltage equipment.

The present invention provides a new and improved support system for electrical cables and high voltage equipment comprising rail-like beams made from insulating material arranged in horizontal and vertical fashion, rail-like cable carrier means made from insulating material adapted to be connected to said beams forming a structure to clamp said cables, grooved rectangular six sided blocks of insulating material having on a first side and an opposite second side two grooves having a size adapted to receive said beams, said grooves all extending across the entire length of the respective surface with said grooves on said first side being disposed perpendicular to said grooves disposed on said second side, at least one hole extending through each block from said first side to said second side and located between said grooves on said first and second sides and threaded nut and bolt assemblies of insulating material for clamping said beams, said cable carrier and said blocks in adjustable positions. The foregoing system may be modified within the scope of the present invention by eliminating the grooves on one or both surfaces of said blocks of insulating material and providing at least four rectilinearly spaced holes extending through said blocks from said first side to said second side. In accordance with the present invention the beams may have a rectangular cross sectional configuration, an L-shaped cross sectional configuration or a U-shaped cross sectional configuration.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 6 is a schematic partial view of a cable support system according to a third embodiment in a transformer.

FIG. 7 is a cross sectional view taken along the line II—II in FIG. 6.

FIG. 8 is a top plan view of a cable support system as shown on the right hand side of FIG. 7.

FIG. 9 is a perspective view of a modified block according to the third embodiment of the present invention.

FIG. 10 is a perspective view of a crossing point utilizing the block of FIG. 9.

DETAILED DESCRIPTION OF THE INVENTION

Figure 1:
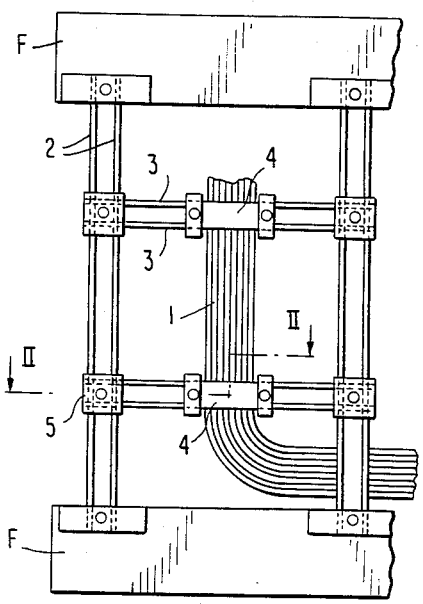
FIG. 1 is a schematic partial view of a cable support system according to the present invention in a transformer.

A support system for electrical cables in high voltage equipment according to the present invention is schematically shown according to a first embodiment in FIG. 1 of the drawings. The cables 1 are shown within a portion of a three phase regulating transformer and are clamped to support beams 3 by means of cable clamps 4. The horizontal support beams 3 are in turn clamped to vertically extending longitudinal beams 2 by means of insulating blocks 5 which are clamped relative to the beams by means of nut and bolt assemblies 7, 8. The longitudinal, vertically extending support beams 2 are in turn secured to the main frame F of the transformer by any suitable means.

Figure 2:
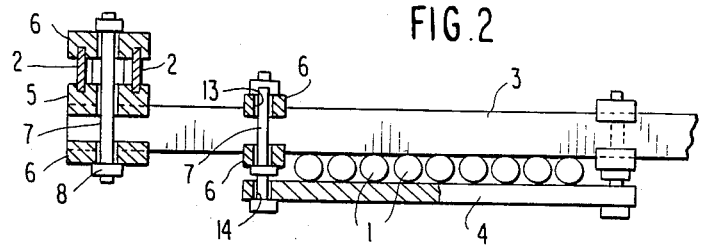
FIG. 2 is a cross sectional view taken along the line II—II in FIG. 1.
Figure 3:
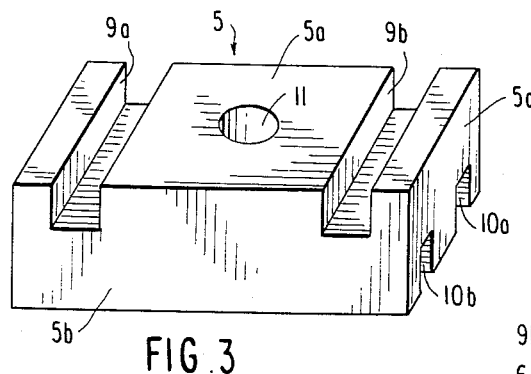
FIG. 3 is a perspective view of a rectangular block of insulating material having grooves according to a first embodiment of the present invention.
Figure 4:
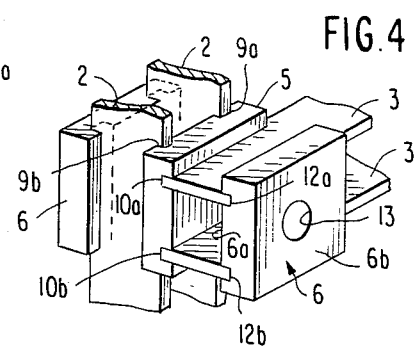
FIG. 4 is a perspective view of a beam crossing point according to the first embodiment of the present invention.
Figure 11:
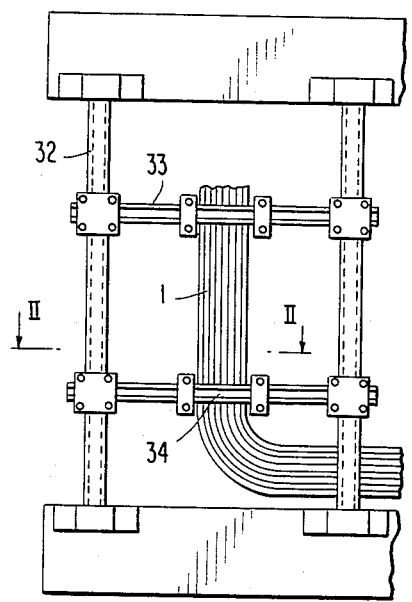
FIG. 11 is a schematic partial view of a cable connection according to a fourth embodiment of the present invention in a transformer.

The details of the cable support system according to the first embodiment are best seen in FIGS. 2–4. A block 5 of the type which is used between the beams 2 and 3 at a connecting point is shown in FIG. 3. The six sided block has a pair of parallel rectilinear grooves 9a, 9b formed in a first side 5a and a second pair of parallel rectilinear grooves 10a, 10b formed in the opposite side surface. The grooves 9a, 9b are disposed at right angles to the grooves 10a, 10b and all of the grooves extend entirely across the surfaces in which they are formed. Thus, the grooves 9a, 9b intersect the side 5b and the side opposite thereto and the grooves 10a and 10b intersect the side 5c and the side opposite thereto. The grooved block 5 has a hole 11 drilled completely therethrough from the first outer side 5a to the opposite side. The hole 11 is located substantially in the center of the block between the grooves 9a, 9b and the grooves 10a, 10b.

The horizontal beams 3 and the vertical beams 2 are comprised of flat, relatively thin boards having a rectangular cross sectional configuration. The beams 2 and 3, as well as the grooves 9a, 9b, 10a, 10b are so dimensioned that the beams will fit closely within the grooves as shown in FIG. 4. In clamping the beams 2 and 3 at right angles to each other, a block 5 having grooves in opposite surfaces is used intermediate the beams 2 and 3 while a pair of blocks 6 sandwich the entire assembly. The blocks 6 are similar to the blocks 5 inasmuch as they have a pair of parallel grooves in a first side 6a and a central hole 13 but do not have grooves in the opposite side surface 6b. When the blocks 5 and 6 are in assembled condition as shown in FIG. 4 the holes 11 and 13 are aligned for the reception of a nut and bolt assembly 7, 8 whereby the entire joint assembly is clamped together. The crossing point as illustrated in FIG. 4 can easily be moved along the length of the beams 2 or along the length of the beams 3 depending upon the specific configuration required for the cable clamps.

The cables 1 may be clamped to the beams 2 or 3 at any point along the length thereof by means of the clamping arrangement shown in FIG. 2. As shown in this Figure a plurality of cables 1 are secured in side-by-side relation against a beam 3 by means of a clamping member 4 having a hole 14 in each end thereof. A pair of blocks 6 are disposed at each end of the clamping member 4 in engagement with the beams 3 and with the apertures 13 disposed in alignment with the apertures 14 in the clamping member 4. The blocks 6 and clamping member 4 are then secured together by means of a nut a bolt assemblies 7, 8 extending through the aligned holes.

Figure 5:
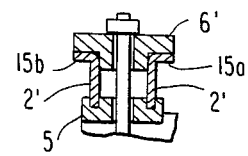
FIG. 5 is a partial cross sectional view similar to FIG. 2 showing a modified construction according to a second embodiment of the present invention.

While the beams 2 and 3 have a rectangular cross sectional configuration in the first embodiment of FIGS. 1–4 the vertical beams 2' in the second embodiment of FIG. 5 have an L-shaped configuration. A block 6' is provided having two angle-like grooves 15a, 15b which are designed to receive the short legs of the L-shaped beams 2'. The opposite ends of the L-shaped beams 2' disposed in the grooves of a block 5 as illustrated in FIG. 3. The beams 2' with the L-shaped cross sectional configuration are used when it is necessary to achieve a structure having a higher resistance to bending.

All of the beams, clamps, nut and bolt assemblies and blocks in the first and second embodiments of FIGS. 1–5 are constructed of insulating material. By the use of the sliding, clamp type connections between the various components of the system it is possible to adapt the system for use in a multitude of differently designed transformers in an economical manner. Only a small number of standard parts are required for the system so that the entire cable support system can be easily stocked with standard dimension parts permitting the satisfaction of all mechanical and electrical requirements for any application. If oil impregnable transformer board is used as the material of the beams and clamps, the support structure can be used in situations up to the highest voltages. As pointed out previously, the cables may be clamped to the vertical beams as well as the horizontal beams to provide a very versatile cable support system.

A third embodiment of the present invention is shown in FIGS. 6–10 wherein the block 25 which corresponds to the block 5 in the first embodiment does not have any grooves but is provided with four holes 29 extending from the first side 25a through the block to the opposite side adjacent each corner of the rectangular block. The sides 25b, 25c and the sides opposite thereof are completely smooth and unbroken. The beams 22 and 23 have a rectangular cross sectional configuration and are adapted to be abutted directly against each other at the points of intersection as best seen in FIGS. 7 and 10. A pair of blocks 25 are disposed in engagement with the beams 22 and 23 adjacent each point of intersection and two identical nut and bolt assemblies 27, 28 extend through the aligned apertures 29 at diagonally opposite corners of the box to clamp the beams 22 and 23 together with a frictional connection. A pair of additional nuts 28a are utilized on the bolt 27 between the box to stabilize the assembly. The clamping bar 24 is substantially identical to the clamping bar 4 of the first embodiment and the cables 1 are clamped against the surface of the beam 23 by means of clamping blocks 26 and nut and bolt assemblies 27, 28.

Figure 14:
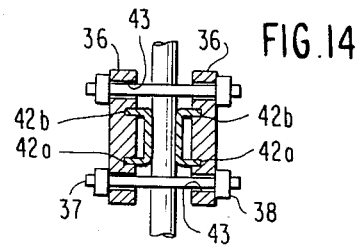
FIG. 14 is a cross sectional view taken along the line C—C in FIG. 13.
Figure 15:
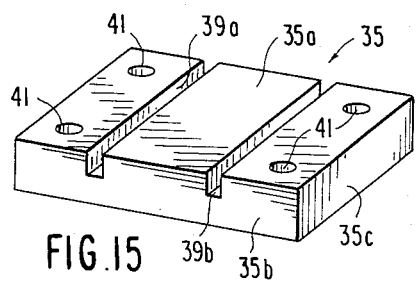
FIG. 15 is a perspective view of a modified block according to the fourth embodiment of the present invention.
Figure 16:
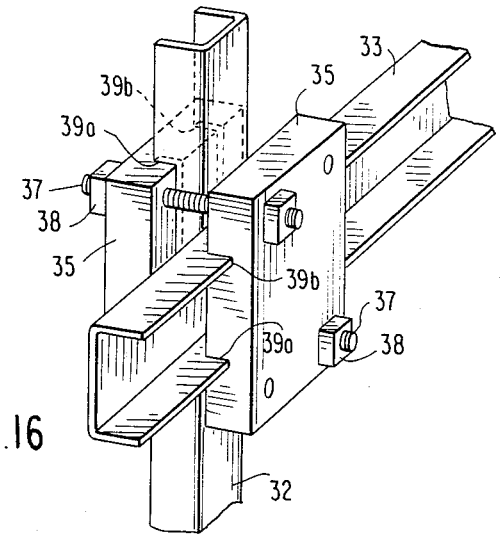
FIG. 16 is a perspective view of a crossing point utilizing the block of FIG. 15.

A fourth embodiment of the present invention is shown in FIGS. 11–16 wherein the vertical and horizontal beams 32, 33 and the clamping bar 34 all have a U-shaped cross sectional configuration. The beams 32 and 33 are assembled into a cable supporting frame with the flat surfaces thereof disposed in abutting relation as seen in FIG. 16. A pair of clamping blocks 35 are disposed on opposite sides of the intersection similar to the previous embodiment and the entire joint is clamped together by means of nut and bolt assemblies 37, 38 through diagonally opposite corners of the clamping box similar to the arrangement in the previous embodiment.

Since the support beams 32, 33 have a U-shaped cross sectional configuration the clamping blocks 35 are constructed as shown in FIG. 15. A pair of parallel rectilinear grooves 39a, 39b are located in the first side 35a of the block and are spaced apart a distance equal to the spacing between the sides of the U-shaped beams. The grooves have a configuration complementary to the sides of the U-shaped beams for reception of the sides of the beams in the grooves. Four apertures 41 are located in each corner of the block 35 and extend from the first side 35a to the opposite side. The channels 39a, 39b intersect the side 35b and the side opposite thereto while the side 35c and the side opposite thereto are completely smooth and unbroken.

Figure 13:
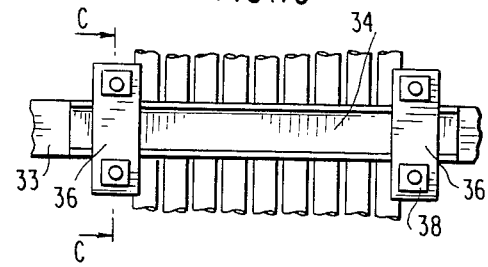
FIG. 13 is a plan view taken in the direction of the arrow B of the cable clamping mechanism at the right hand side of FIG. 12.
Figure 12:
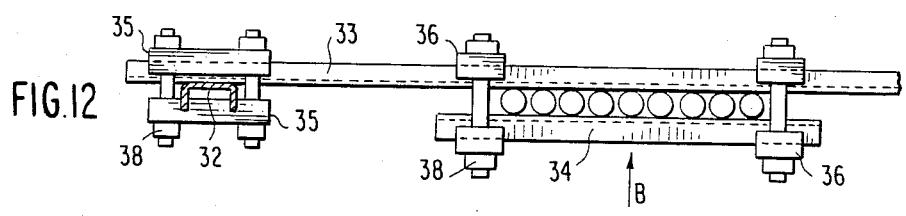
FIG. 12 is a cross sectional view taken along the line II—II in FIG. 11.

The blocks 36 which are used in conjunction with the support beams 32 or 33 and the clamping bar 34 are provided with a pair of parallel grooves 42a, 42b and contain a maximum of two holes 43 located outside the grooves. The blocks are clamped against the respective beams 32 or 33 and the clamping bar 34 and are clamped thereto by means of nut and bolt assemblies 37, 38 as best seen in FIGS. 12–14.

In all of the embodiments it is clearly seen that a cable support system is provided wherein all of the components thereof are made from insulating material in order to enable the cable support system to be utilized with high voltage equipment. The cable support system is made up of vertical and horizontal beams, cable clamps, groove blocks as well as threaded nuts and bolts. Such a support system is universally applicable and permits an optimal fit to any application with a minimum number of different elements.

While the invention has been particularly shown and described with reference to preferred embodiments thereof, it will be understood by those in the art that the foregoing and other changes in form and details may be made therein without departing from the spirit and scope of the invention.

What is claimed is:

1. A support system for electrical cables in high voltage equipment comprising a plurality of support beams of insulating material disposed at right angles to each other to define at least one intersection point, first clamping means of insulating material engaging said support beams at each intersecting point to adjustably secure said beams relative to each other and second clamping means of insulating material adapted to clamp at least one cable to one of said beams wherein each support beam is comprised of two parallel spaced apart strips of material and the first clamping means is comprised of a first rectilinear block of insulating material having a first pair of parallel spaced apart grooves in one surface thereof receiving said two strips constituting a first beam and a second pair of parallel spaced apart grooves in the opposite surface of said block disposed at right angles to said first pair of grooves receiving the two strips constituting a second beam at right angles to said first beam and two second blocks of insulating material each having a pair of parallel spaced apart grooves in one surface thereof receiving the two parallel strips of a first beam and a second beam respectively with said second blocks being aligned with said first blocks and insulating securing means for clamping said blocks and said beams together at said intersecting point.

2. A support system as set forth in claim 1 said parallel strips of each beam have a rectilinear cross sectional configuration.

3. A support system as set forth in claim 1 wherein said parallel strips of material constituting each beam each have a right angle cross sectional configuration.

4. A support system as set forth in claim 1 wherein said second clamping means is comprised of an elongated bar having an aperture in each end thereof extending in parallel spaced relation to one of said beams, a pair of blocks identical to said second blocks engaging said beam on opposite sides thereof in alignment with each end of said bar and securing means for securing said blocks and said bars to said beam with said at least one cable clamped between said bar and said beam.

5. A support system as set forth in claim 1 wherein each beam is comprised of a single strip of insulating material having a rectangular cross sectional configuration and said first clamping means is comprised of a pair of blocks of insulating material each having a rectilinear configuration with at least two holes extending therethrough at diagonally opposite corners of each block and insulating securing means extending through said apertures in said blocks with said blocks disposed on opposite sides of an intersecting point for clamping two beams at substantially right angles to each other.

6. A support system as set forth in claim 1 wherein said second clamping means is comprised of an elongated clamping bar having an aperture in each end thereof extending parallel to one of said beams, two pair of blocks having a rectilinear configuration and each having a pair of holes extending therethrough and securing means for securing each pair of blocks and one end said bar together for clamping at least one cable to said beam between said bar and said beam.

7. A support system for electrical cables in high voltage equipment comprising a plurality of support beams of insulating material disposed at right angles to each other to define at least one intersection point, first clamping means of insulating material engaging said support beams at each intersecting point to adjustably secure said beams relative to each other and second clamping means of insulating material adapted to clamp at least one cable to one of said beams wherein each of said beams is comprised of a single elongated strip of insulating material having a U-shaped cross sectional configuration and said first clamping means is comprised of a pair of blocks each having a pair of parallel spaced apart grooves in one surface thereof receiving the sidewalls of a respective U-shaped beam at an intersecting point and securing means for clamping said beams at said intersecting point against each other between said blocks.

8. A support system for electrical cables in high voltage equipment comprising a plurality of support beams of insulating material disposed at right angles to each other to define at least one intersection point, first clamping means of insulating material engaging said support beams at each intersecting point to adjustably secure said beams relative to each other and second clamping means of insulating material adapted to clamp at least one cable to one of said beams wherein said second clamping means is comprised of an elongated clamping bar having a U-shaped cross sectional configuration with an aperture at each end thereof, two pairs of blocks each having a pair of parallel spaced apart grooves in one surface thereof receiving said beam and said bar at opposite ends thereof and securing means for clamping said blocks, said beam and said bar together to clamp at least one cable between said beam and said bar.

* * * * *